United States Patent
Bryce

(10) Patent No.: US 10,479,272 B2
(45) Date of Patent: Nov. 19, 2019

(54) VEHICLE DRIVER NOTIFICATION ASSEMBLY

(71) Applicant: Steven Bryce, Las Vegas, NV (US)

(72) Inventor: Steven Bryce, Las Vegas, NV (US)

( * ) Notice: Subject to any disclaimer, the term of this patent is extended or adjusted under 35 U.S.C. 154(b) by 0 days.

(21) Appl. No.: 15/913,628

(22) Filed: Mar. 6, 2018

(65) Prior Publication Data

US 2019/0275936 A1   Sep. 12, 2019

(51) Int. Cl.

| | |
|---|---|
| *G08G 1/16* | (2006.01) |
| *B60Q 9/00* | (2006.01) |
| *G08G 1/0962* | (2006.01) |
| *G06K 9/00* | (2006.01) |
| *G01S 13/93* | (2006.01) |
| *G01S 13/86* | (2006.01) |

(52) U.S. Cl.
CPC .............. *B60Q 9/00* (2013.01); *G01S 13/867* (2013.01); *G01S 13/931* (2013.01); *G06K 9/00818* (2013.01); *G06K 9/00825* (2013.01); *G08G 1/09623* (2013.01); *G08G 1/09626* (2013.01); *G01S 2013/9392* (2013.01)

(58) Field of Classification Search
USPC ......................................... 340/905, 439, 576
See application file for complete search history.

(56) References Cited

U.S. PATENT DOCUMENTS

| | | | |
|---|---|---|---|
| 6,396,417 B2 | 5/2002 | Lee | |
| 6,985,073 B1 | 1/2006 | Doan | |
| 8,504,270 B2 | 8/2013 | Busch | |
| 8,599,040 B2 | 12/2013 | Malaska | |
| 9,092,986 B2 * | 7/2015 | Salomonsson | G08G 1/167 |
| 9,318,021 B2 | 4/2016 | Al-Qaneei | |
| 2002/0126002 A1 * | 9/2002 | Patchell | B60Q 9/008 |
| | | | 340/436 |
| 2005/0200500 A1 | 9/2005 | Wing | |
| 2007/0276581 A1 * | 11/2007 | Bae | G08G 1/16 |
| | | | 701/117 |
| 2017/0243481 A1 * | 8/2017 | Neubecker | G08G 1/095 |
| 2018/0194282 A1 * | 7/2018 | Wolterman | G08G 1/096716 |

* cited by examiner

*Primary Examiner* — Brent Swarthout

(57) ABSTRACT

A vehicle driver notification assembly for notifying a driver when to drive forward includes a housing and a control circuit mounted in the housing. A sensor array is mounted on the housing and is electrically coupled to the control circuit. The sensor array detects parameters that indicate when a vehicle may proceed forward. The parameters include when a mass in front of a vehicle moves away from the vehicle and when the sensor array receives a proceed signal from a requisite traffic signaling device. An alert is electrically coupled to the control circuit and is turned on to provide an emission detectable by a person when the sensor array detects the parameters that allow the vehicle to proceed forward.

11 Claims, 5 Drawing Sheets

VEHICLE DRIVER NOTIFICATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to driver notification devices and more particularly pertains to a new driver notification device for notifying a driver when to drive forward.

BRIEF SUMMARY OF THE INVENTION

An embodiment of the disclosure meets the needs presented above by generally comprising a housing and a control circuit that is mounted in the housing. A sensor array is mounted on the housing and is electrically coupled to the control circuit. The sensor array is configured to detect parameters that indicate when a vehicle may proceed forward. The parameters include when a mass in front of the vehicle moves away from the vehicle and when the sensor array receives a proceed signal from a requisite traffic signaling device. An alert is electrically coupled to the control circuit and is turned on to provide an emission detectable by a person when the sensor array detects the parameters that allow the vehicle to proceed forward. A power supply is mounted on the housing and is electrically coupled to the control circuit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
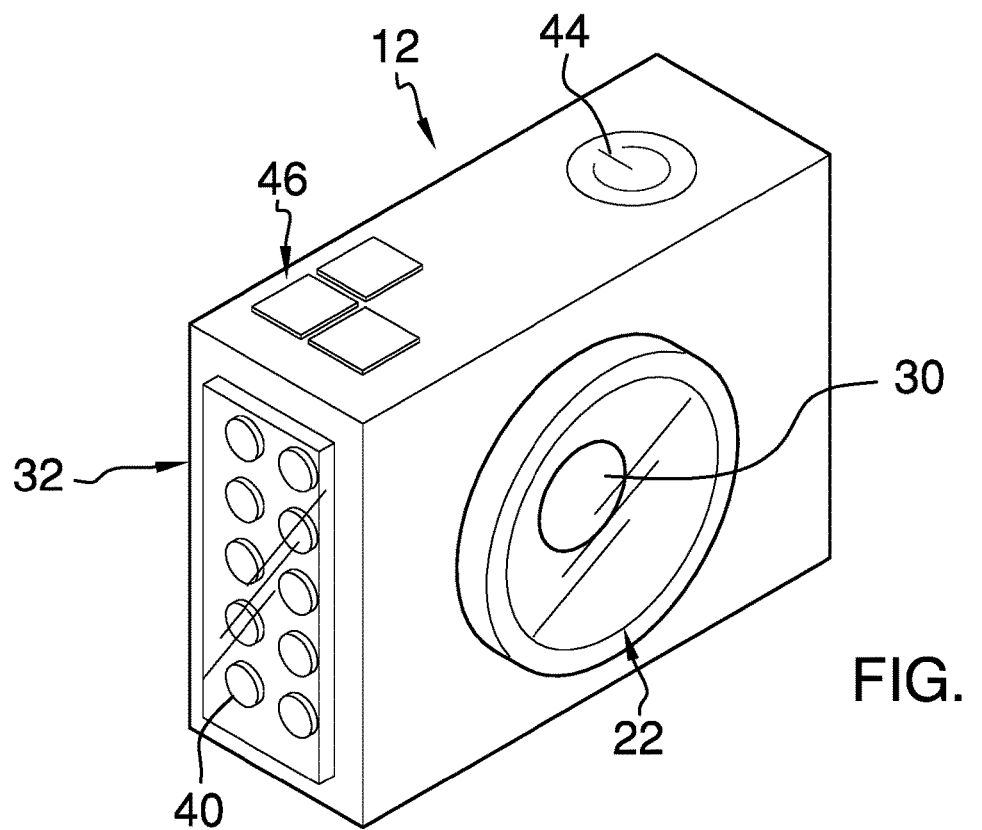
FIG. 1 is a perspective view of a vehicle driver notification assembly according to an embodiment of the disclosure.
Figure 2:
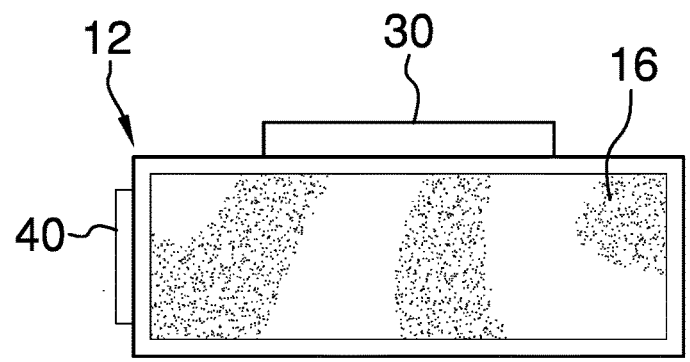
FIG. 2 is a bottom view of an embodiment of the disclosure.
Figure 3:
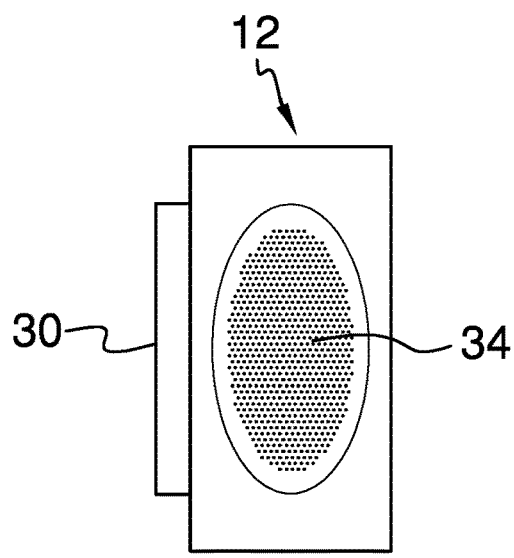
FIG. 3 is a side view of an embodiment of the disclosure.
Figure 4:
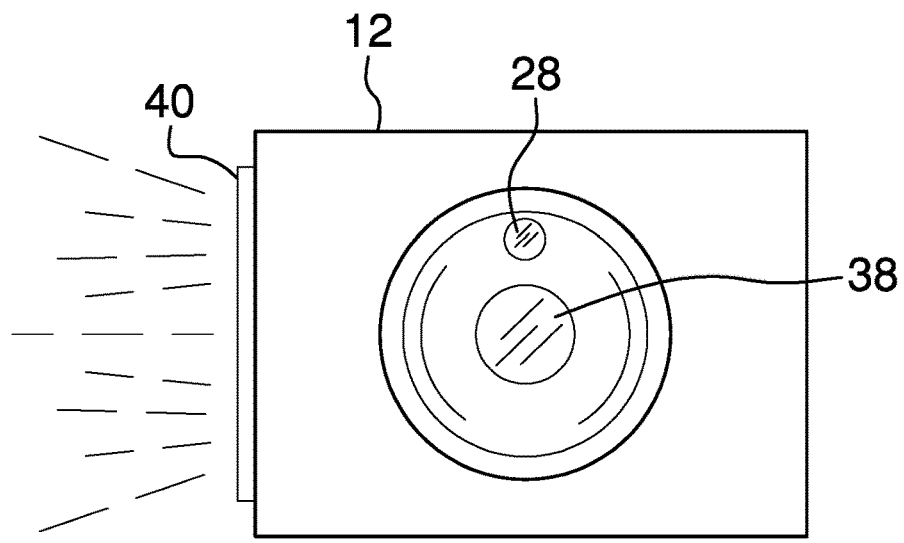
FIG. 4 is a front view of an embodiment of the disclosure.
Figure 5:
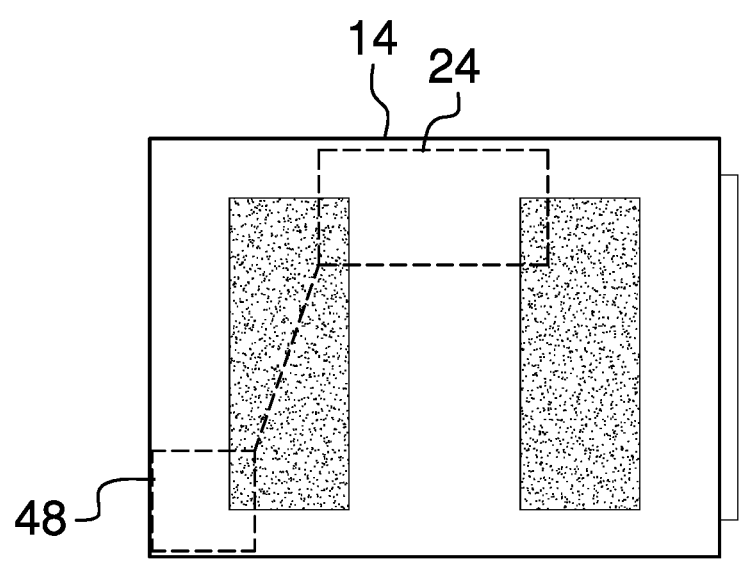
FIG. 5 is a back view of an embodiment of the disclosure.
Figure 6:
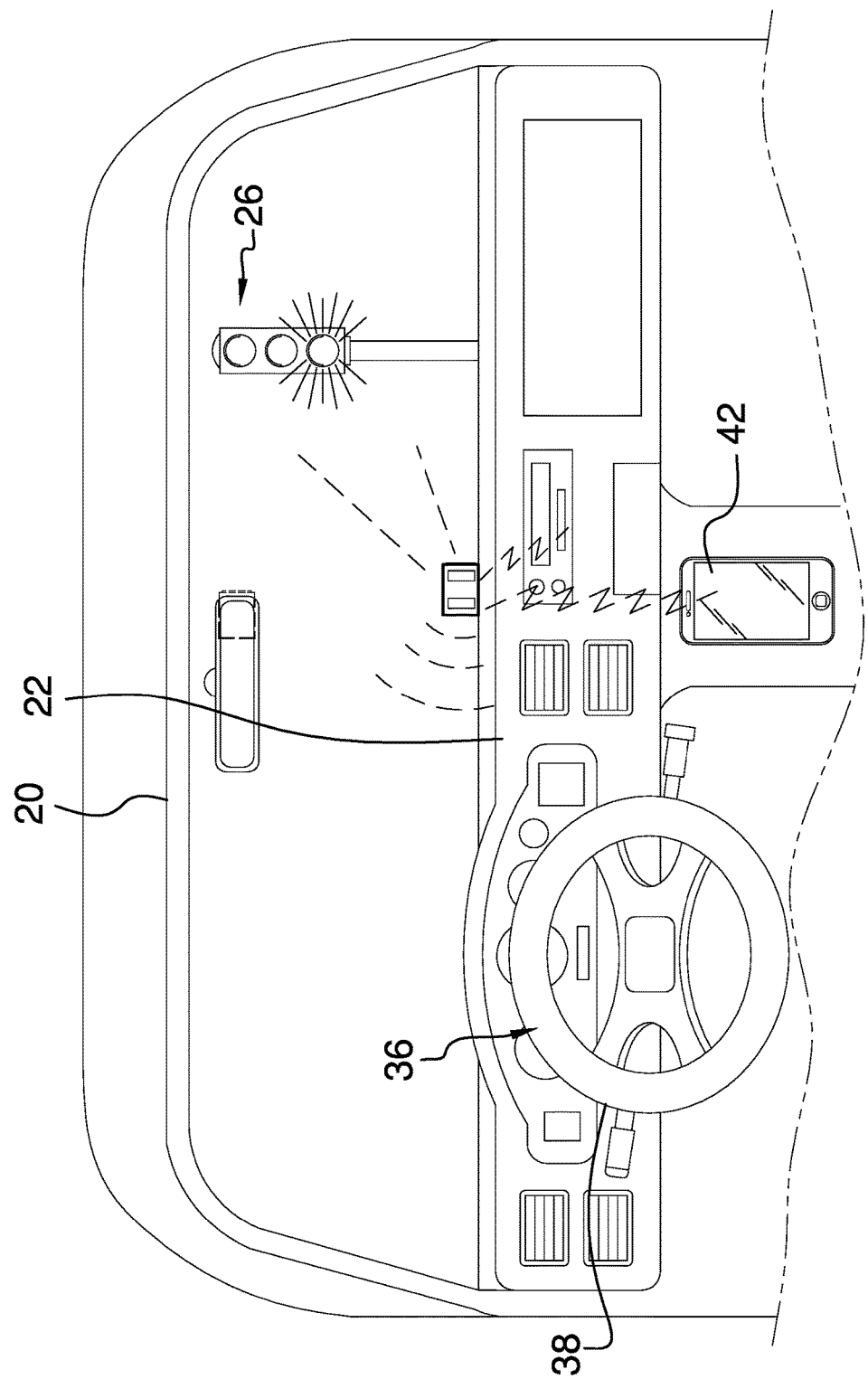
FIG. 6 is a back view of an embodiment of the disclosure.
Figure 7:
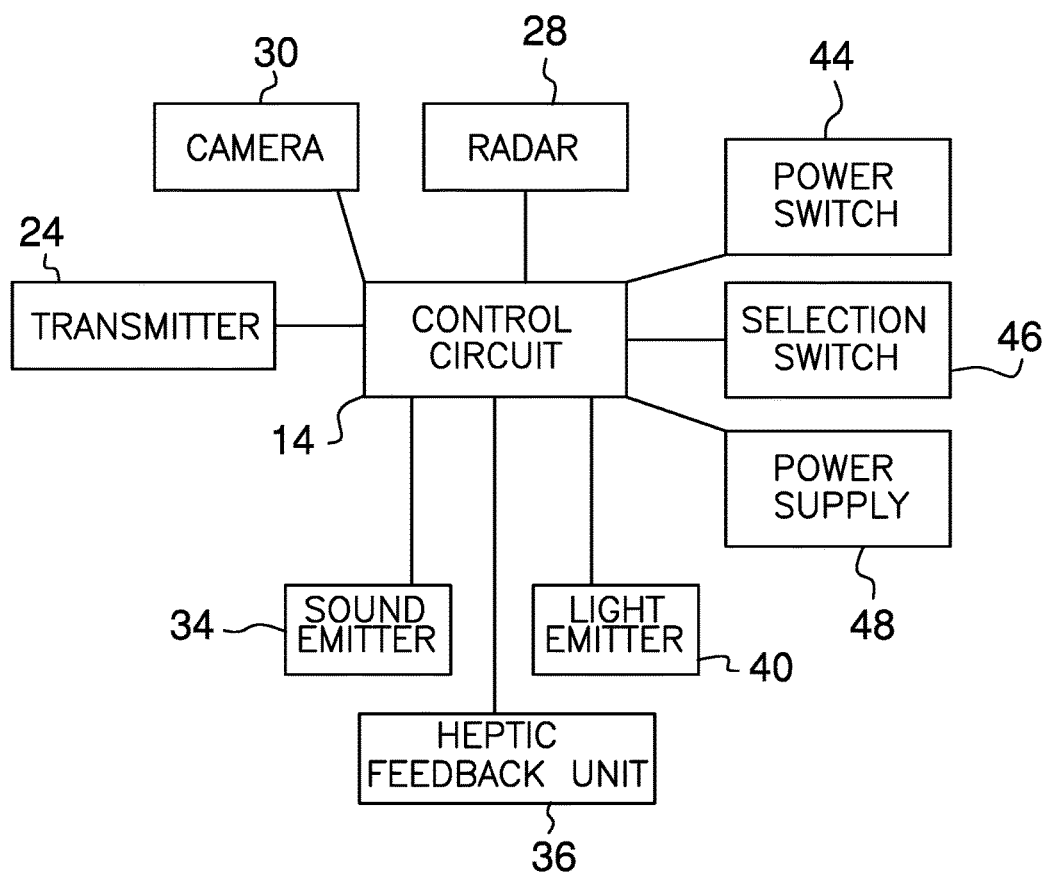
FIG. 7 is a schematic box diagram view of an embodiment of the disclosure.

With reference now to the drawings, and in particular to FIGS. 1 through 7 thereof, a new driver notification device embodying the principles and concepts of an embodiment of the disclosure and generally designated by the reference numeral 10 will be described.

As best illustrated in FIGS. 1 through 7, the vehicle driver notification assembly 10 generally comprises a housing 12 and a control circuit 14 mounted in the housing 12. A mount 16 may be attached to the housing 12 to removably couple the housing 12 to an interior 18 of the vehicle 20. The mount 16 may comprise an adhesive or any other mount 16 suitable to secure the housing 12 to the interior 18 of the vehicle 20. A transmitter 24 is electrically coupled to the control circuit 14 and is mounted in the housing 12. The transmitter 24 transmits each signal received by the control circuit 14.

A sensor array 22 is mounted on the housing 12 and is electrically coupled to the control circuit 14. The sensor array 22 detects parameters that indicate when the vehicle 20 may proceed forward. The parameters include when a mass in front of the vehicle 20 moves away from the vehicle 20 or the sensor array 22 receives a proceed signal from a requisite traffic signaling device 26.

The sensor array 22 detects the mass moving forward of a vehicle 20. The sensor array 22 may include a radar 28, as are conventionally used to detect vehicles in proximity sensors, that is electrically coupled to the control circuit 14 and is directed forward of the vehicle 20. The radar 28 detects the mass that is positioned within a detection range wherein the control circuit 14 receives a first input when the radar 28 detects the mass and a second input when the radar 28 detects the mass moving away from the sensor array 22. The detection range may be between 10.0 feet and 40.0 feet forward of the radar 28.

The sensor array 22 identifies requisite traffic signaling devices 26. The sensor array 22 includes a camera 30 that intermittently images structures forward of the vehicle 20 and compares a plurality of captured images of traffic signaling devices against a plurality of stored images of traffic signaling devices. The control circuit 14 receives a third input from the sensor array 22 when one or more of the captured images matches one or more of the stored images of a traffic signaling device signaling to proceed. The requisite traffic signaling devices 26 include, but should not be limited to, traffic lights, stop signs and other devices that indicate to the driver of the vehicle how the flow of traffic is to proceed.

For example, if the matched requisite traffic signaling device 26 is a traffic light the camera 30 detects traffic light coloration associated with the known traffic light. The traffic light coloration may include a visible red light and a visible green light. The control circuit 14 receives the third input from the sensor array 22 when the camera 30 detects the visible red light being turned off and the visible green light being turned on. Alternatively, the sensor array 22 may detect radio frequency waves emitted by the traffic light to indicate to smart cars what signal is being displayed.

An alert 32 is electrically coupled to the control circuit 14. The alert 32 is turned on to provide an emission detectable by a person when the sensor array 22 detects parameters that allow the vehicle 20 to proceed forward. The alert 32 may include a sound emitter 34 that is electrically coupled to the control circuit 14 and is mounted in the housing 12. The sound emitter 34 emits an audible alarm when actuated. A haptic feedback 36 unit may be mounted in the vehicle 20 and is electrically coupled to the control circuit 14. The haptic feedback 36 unit is positioned on a driver's seat or a steering wheel 38 of the vehicle 20. Moreover, the haptic feedback unit 36 may comprise a vibrating pad that is mounted on the driver's seat or the steering wheel 38. The vibrating pad provides haptic feedback to the driver when the alert 32 is turned on. A light emitter 40 may be electrically coupled to the control circuit 14 and mounted to the housing 12. The light emitter 40 emits a visible light when actuated. Each of the sound emitter 34, the haptic feedback unit 36 and the light emitter 40 are actuated when the control circuit 14 receives the second and third inputs from the sensor array 22 or an absence of the first input combined with receiving the third input.

A remote receiver 42 is positioned remote of the housing 12. The remote receiver 42 is in wireless communication with the transmitter 14 and emits an alarm when the sensor array 22 indicates parameters that allow the vehicle 20 to proceed forward. The remote receiver 42 may include a cellular phone, a radio frequency receiver mounted to the vehicle 20, a remote light emitter, a display mounted in the vehicle and may also employ a WPAN signal and Bluetooth communication protocols, but should not be limited to such. The remote receiver 42 may alert the driver of the alarm transmitted by the transmitter 24, through an audible, visual or haptic alarm.

A power switch 44 is mounted on the housing 12 and is electrically coupled to the control circuit 14 wherein the power switch 44 is actuated to turn the control circuit 14 on or off. Additionally, a selection switch 46 is mounted on the housing 12 and is electrically coupled to the control circuit 14. The selection switch 12 is actuated to selectively and discretely turn on or off each of the light emitter 40, the sound emitter 34, and the haptic feedback unit 36. A power supply 48 is mounted on the housing 12 and is electrically coupled to the control circuit 14. The power supply 48 may comprise at least one battery.

In use, the housing 12 is mounted on the interior 18 of the vehicle 20. The power switch 44 is actuated to turn on the control circuit 14. The selection switch 46 is actuated to turn on selected ones of the light emitter 40, the sound emitter 34 and the haptic feedback unit 36. The sensor array 22 intermittently detects forward of the vehicle 20 to determine whether the driver may pull forward. The alert 32 is actuated when the sensor array 22 detects a mass leave from within the detection range or when the sensor array 22 detects the requisite traffic signaling devices 26 and matches the captured image to a stored image of the requisite traffic device.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A notification system configured to be positioned on a dashboard of a vehicle to notify a driver when they may proceed driving forward, said notification system comprising:

a housing;

a control circuit being mounted in said housing;

a transmitter being electrically coupled to said control circuit and being mounted in said housing, said transmitter transmitting each signal received by said control circuit;

a sensor array mounted on said housing, said sensor array being electrically coupled to said control circuit, said sensor array being configured to detect parameters indicating when a vehicle may proceed forward, said parameters including when a mass in front of the vehicle moves away from the vehicle or when said sensor array receives a proceed signal from a requisite traffic signaling device, said sensor array being configured to detect a mass moving forward of a vehicle, said sensor array including a radar, said radar being electrically coupled to said control circuit and directed forward of the vehicle, said radar detecting said mass being positioned within a detection range, said control circuit receiving a first input when said radar detects said mass and a second input when said radar detects said mass moving away from said sensor array, said sensor array identifying requisite traffic signaling devices, said sensor array including a camera, said camera being configured to intermittently image structures forward of the vehicle and compare a plurality of captured images of traffic signaling devices against a plurality of stored images of traffic signaling devices, said control circuit receiving a third input from said sensor array when one or more of said captured images matches one or more of said stored images of a traffic signaling device signaling to proceed;

an alert including at least one of a light emitter or sound emitter being electrically coupled to said control circuit, said alert being turned on to provide an emission detectable by a person when said sensor array detects said parameters indicating the vehicle may proceed forward, said alert further includes a haptic feedback unit being configured to be mounted in the vehicle, said haptic feedback unit being electrically coupled to said control circuit, said haptic feedback unit being configured to be positioned on a driver's seat or a steering wheel of the vehicle;

a power supply being mounted on said housing, said power supply being electrically coupled to said control circuit; and a selection switch being mounted on said housing, said selection switch being electrically coupled to said control circuit, said selection switch being actuated to selectively and discretely turn on or off each of said light emitter, said sound emitter, and said haptic feedback unit.

2. The notification system according to claim 1, wherein said detection range is between 10.0 feet and 40.0 feet.

3. The notification system according to claim 1, wherein said alert comprises a sound emitter being electrically coupled to said control circuit, said sound emitter being mounted in said housing.

4. The notification system according to claim 3, wherein said sound emitter emits an audible alarm either when said control circuit receives said first input and said second input or an absence of said first input combined with receiving said third input.

5. The notification system according to claim 1, wherein said haptic feedback unit is actuated to provide haptic feedback to the driver either when said control circuit receives said first input and said second input or an absence of said first input combined with receiving said third input.

6. The notification system according to claim 1, wherein said alert further includes light emitter being electrically coupled to said control circuit, said light emitter being mounted to said housing.

7. The notification system according to claim 6, wherein said light emitter emits visible light either when said control circuit receives said first input and said second input or an absence of said first input combined with receiving said third input.

8. The notification system according to claim 1, further including a remote receiver being positioned remote of said housing, said remote receiver being in wireless communication with said transmitter and emitting an alarm when said sensor array indicates parameters allowing the vehicle to proceed forward.

9. The notification system according to claim 1, further including a power switch being mounted on said housing, said switch being electrically coupled to said control circuit, said power switch being actuated to turn said control circuit on or off.

10. The notification system according to claim 1, wherein said power supply comprising at least one battery.

11. A notification system configured to be positioned on a dashboard of a vehicle to notify a driver when they may proceed driving forward, said notification system comprising:

a housing;
a control circuit being mounted in said housing;
a transmitter being electrically coupled to said control circuit and being mounted in the housing, said transmitter transmitting each signal received by said control circuit;

a sensor array mounted on said housing, said sensor array being electrically coupled to said control circuit, said sensor array being configured to detect parameters indicating when a vehicle may proceed forward, said parameters including when a mass in front of the vehicle moves away from the vehicle and when said sensor array receives a proceed signal from a requisite traffic signaling device, said sensor array comprising:

said sensor array being configured to detect said mass moving forward of a vehicle, said sensor array including a radar, said radar being electrically coupled to said control circuit and being directed forward of the vehicle, said radar detecting said mass being positioned within a detection range, said control circuit receiving a first input when said radar detects said mass and a second input when said radar detects said mass moving away from said sensor array, said detection range being between 10.0 feet and 40.0 feet;

said sensor array identifying requisite traffic signaling devices, said sensor array including a camera wherein said camera is configured to intermittently image structures forward of the vehicle and compare a plurality of captured images of traffic signaling devices against a plurality of stored images of traffic signaling devices, said control circuit receiving a third input from said sensor array when one or more of said captured images matches one or more of said stored images of a traffic signaling device signaling to proceed;

an alert being electrically coupled to said control circuit, said alert being turned on to provide an emission detectable by a person when said sensor array detects said parameters indicating the vehicle may proceed forward, said alert comprising:

a sound emitter being electrically coupled to said control circuit, said sound emitter being mounted in said housing, said sound emitter emitting an audible alarm either when said control circuit receives said first input and said second input or an absence of said first input combined with receiving said third input;

a haptic feedback unit being mounted in the vehicle, said haptic feedback unit being electrically coupled to said control circuit, said haptic feedback unit being positioned on a driver's seat or a steering wheel of the vehicle, said haptic feedback unit being actuated to provide haptic feedback to the driver either when said control circuit receives said first input and said second input or an absence of said first input combined with receiving said third input;

a light emitter being electrically coupled to said control circuit, said light emitter being mounted to said housing, said light emitter emitting a visible light either when said control circuit receives said first input and said second input or an absence of said first input combined with receiving said third input;

a remote receiver being positioned remote of said housing, said remote receiver being in wireless communication with said transmitter and emitting an alarm when said sensor array detects said parameters indicating the vehicle may proceed forward;

a power switch being mounted on said housing, said switch being electrically coupled to said control circuit, said power switch being actuated to turn said control circuit on or off; and a selection switch being mounted on said housing, said selection switch being electrically coupled to said control circuit, said selection switch being actuated to selectively and discretely turn on or off each of said light emitter, said sound emitter, and said haptic feedback unit; and a power supply being mounted on said housing, said power supply being electrically coupled to said control circuit, said power supply comprising at least one battery.

* * * * *